US006253090B1

(12) United States Patent
Nobbs

(10) Patent No.: US 6,253,090 B1
(45) Date of Patent: Jun. 26, 2001

(54) COMMUNICATION APPARATUS

(76) Inventor: Pamela J Nobbs, 1 Veldtuln Place, West Road North, Morningside, Sandton, Gauteng (ZA)

( * ) Notice: Subject to any disclaimer, the term of this patent is extended or adjusted under 35 U.S.C. 154(b) by 0 days.

(21) Appl. No.: 09/068,734

(22) PCT Filed: Nov. 13, 1996

(86) PCT No.: PCT/GB96/02757

§ 371 Date: May 13, 1998

§ 102(e) Date: May 13, 1998

(87) PCT Pub. No.: WO97/18539

PCT Pub. Date: May 22, 1997

(30) Foreign Application Priority Data

Nov. 13, 1995 (ZA) ..................................................... 95/9611

(51) Int. Cl.[7] ..................................................... H04B 7/00

(52) U.S. Cl. ............................ 455/500; 455/507; 705/15

(58) Field of Search .................................. 455/11.1, 500, 455/507; 705/11, 15, 26, 21

(56) References Cited

U.S. PATENT DOCUMENTS

| | | | | |
|---|---|---|---|---|
| 4,415,065 | * | 11/1983 | Sandstedt | 705/15 |
| 4,530,067 | * | 7/1985 | Dorr | 705/15 |
| 5,202,825 | * | 4/1993 | Miller et al. | 705/21 |
| 5,408,679 | * | 4/1995 | Masuda | 455/11.1 |
| 5,790,938 | * | 8/1998 | Talarmo | 455/11.1 |
| 5,850,605 | * | 12/1998 | Souissi et al. | 455/11.1 |
| 5,890,054 | * | 3/1999 | Logsdon et al. | 455/11.1 |
| 5,907,540 | * | 5/1999 | Hayashi | 455/11.1 |

* cited by examiner

*Primary Examiner*—Nay Maung
*Assistant Examiner*—Quochien B. Vuong
(74) *Attorney, Agent, or Firm*—Howrey Simon Arnold & White, LLP

(57) ABSTRACT

A communication apparatus comprises a network of transmitters and receivers communicating with each other by means of UHF radio frequency signals. Each transmitter is linked to one or more associated receivers and can be individually activated to transmit a selected one of a number of different predetermined messages to its associate receivers along a corresponding communication channel. Each transmitter is activatable by means of a respective message selector which enables a user thereof to select the predetermined message to be transmitted by the transmitter.

24 Claims, 1 Drawing Sheet

COMMUNICATION APPARATUS

FIELD OF THE INVENTION

This invention relates to communication apparatus and, more particularly, to communication apparatus suitable for transmitting predetermined messages from a plurality of transmitters to a number of receivers. The communication apparatus can be conveniently applied as an electronic management system in the hospitality, gaming and retail merchandising industries.

BACKGROUND TO THE INVENTION

Although this invention will be described with particular reference to application of the communication apparatus in hospitality establishments such as restaurants or the like, it is to be clearly understood that the use of the invention is not limited to this particular application.

Diners at a restaurant or similar establishment generally need to make a number of different service requests during the course of meal, for example, summoning a waiter, requesting the bill, summoning the bar steward, requesting the menu, ordering food, and the like.

Such service requests are generally communicated verbally to a waiter assigned to the diners' table, or to the manager of the establishment. This is problematic as it is often difficult to obtain the attention of the waiter or the manager, particularly if the establishment is busy.

OBJECT OF THE INVENTION

It is an object of this invention to provide a communication apparatus which will, at least partially, alleviate the above-mentioned difficulty.

SUMMARY OF THE INVENTION

In accordance with this invention, there is provided a communication apparatus, comprising:

a number of slave receivers;

a plurality of transmitters, each transmitter being associable with a selected at least one of the slave receivers and being activatable to transmit any selected one of a plurality of different predetermined messages to its associated at least one slave receiver along a communication channel; and message selector means associated with each transmitter for activating the transmitter to transmit the selected one of the plurality of different predetermined messages to the associated at least one slave receiver.

A further feature of the invention provides for the communication apparatus to include a master receiver for receiving the plurality of different predetermined messages from all of the plurality of transmitters.

Still further features of the invention provide for each transmitter to be associable with a plurality of slave receivers, and for each slave receiver to be associable with a plurality of different transmitters.

Yet further features of the invention provide for each one of the plurality of different predetermined messages to include an identification code representative of the transmitter from which the predetermined message was transmitted, for each one of the plurality of different predetermined messages transmitted by a transmitter to also include a different message type code, for the predetermined messages to be pulse messages, for the pulse messages to be modulated according to pulse position, and for the pulse messages to contain 24 data bits.

Preferably, the communication channel is a radio frequency channel, the radio frequency channel is an ultra high frequency (UHF) channel, and each transmitter and receiver includes a surface acoustic wave resonator.

Yet still further features of the invention provide for the transmitters to be battery powered, for the message selector means to be a keypad, alternatively a membrane keyboard, for each of the slave receivers and the master receiver to include a corresponding display means for displaying the data contained in a message transmitted from any one of its associated transmitters, and for the display means to be a digital display means.

There is also provided for the display means of each slave receiver to be configurable to only display data contained in messages transmitted from any one of its associated transmitters and which contain selected message type codes, for each slave receiver to include a storage buffer for storing data corresponding to a plurality of messages received from its associated transmitters, and for the master receiver to include a storage buffer for storing data corresponding to a plurality of messages received from all the transmitters of the communication apparatus.

The invention extends to a communication method comprising the steps of:

selecting, by means of a message selector means, a selected one of a plurality of different predetermined messages to be transmitted by a particular one of a plurality of transmitters to an associated slave receiver;

including in the predetermined message an identification code representative of the particular one of the plurality of transmitters; and activating the particular one of the plurality of transmitters to transmit the predetermined message to the associated slave receiver.

There is also provided for the method to include the further step of including in the selected predetermined message a message type code representative of the selected one of the plurality of predetermined messages.

There is further provided for the method to include the further steps of:

receiving the transmitted message at the associated slave receiver;

retrieving from the received message the identification and message type codes; and displaying the codes on a display means associated with the slave receiver.

There is still further provided for the method to include the further steps of:

receiving the transmitted message at a master receiver;

retrieving from the received message the identification and message type codes; and displaying the codes on a display means associated with the master receiver.

There is yet still further provided for storing in each slave receiver data corresponding to a plurality of messages received from its associated transmitters, and for storing in the master receiver data corresponding to a plurality of messages received from all the transmitters of the communication apparatus. dr

BRIEF DESCRIPTION OF THE DRAWING

One embodiment of the invention is described below, by way of example only, and with reference to the accompanying sketches, in which.

DETAILED DESCRIPTION OF THE INVENTION

Figure 1:
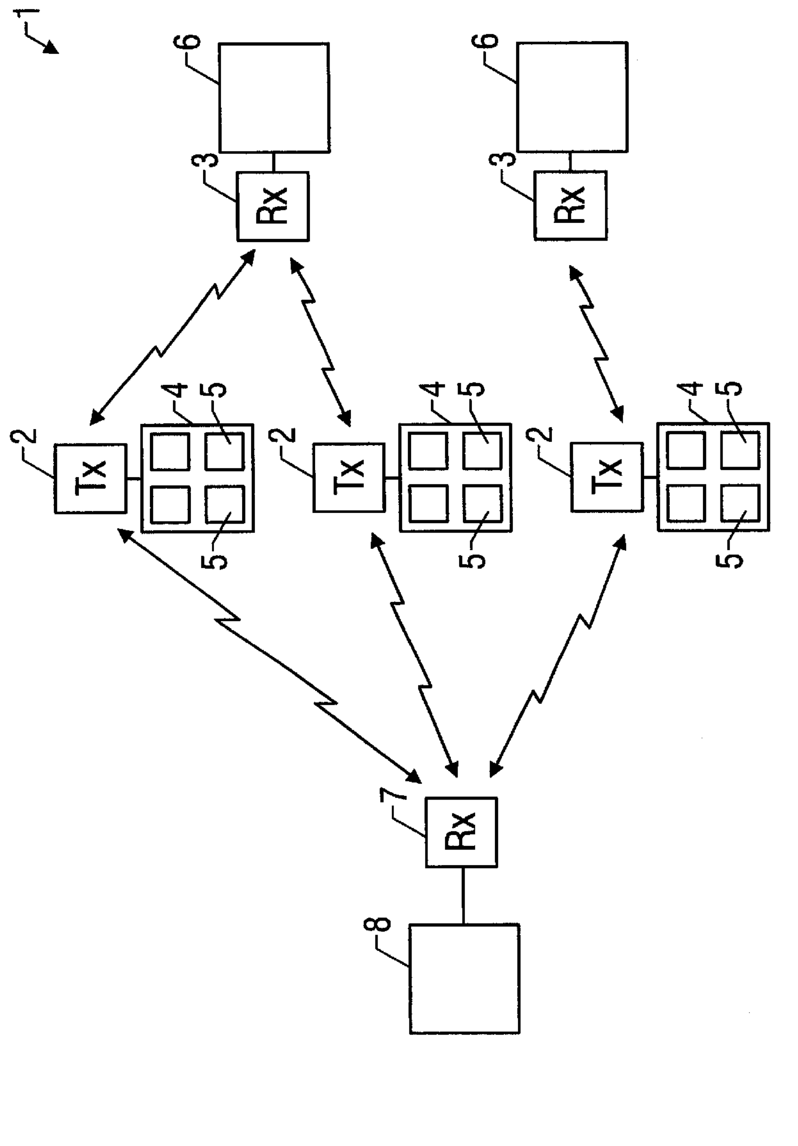
FIG. 1 is a schematic representation of a communication apparatus according to the invention.

Referring to FIG. 1, a communication apparatus is indicated generally by reference numeral (1). The communication apparatus (1) comprises a plurality of radio frequency transmitters (2) and a number of radio frequency slave receivers (3). For convenience and for illustrative purposes, the number of transmitters (2) and slave receivers (3) will be limited to three and two respectively, but it is to be clearly understood that the invention is not limited to this particular number of slave receivers and transmitters. Each transmitter (2) is associated with a particular one of the slave receivers (3). More than one of the transmitters (2) may be associated with a particular slave receiver (3) by utilising, for example, a predetermined common carrier frequency.

Each transmitter (2) is connected to a message selector means (4) in the form of a keypad or a membrane keyboard. A unique three digit transmitter identification code may be programmed into each transmitter (2) by means of its associated keypad (4), as well as an additional single digit code which will be referred to as a site code. Each keypad (4) includes four activation buttons (5), the function of which will be explained in greater detail below.

Each slave receiver (3) is connected to a display device (6) such as a light emitting diode display or a liquid crystal display.

The radio frequency transmitters and receivers operate in the ultra high frequency (UHF) portion of the radio frequency spectrum and each transmitter (2) and slave receiver (3) contains a microprocessor (not shown) and a surface acoustic wave resonator (not shown). The design of such transmitters and slave receivers is well known in the art and is therefore not outlined in detail in this specification. The transmitters and receivers are battery powered, preferably by lithium batteries.

In use, a transmitter (2) may be activated to transmit a predetermined message to its associated slave receiver (3). In order to maximise the transmitter battery life, the predetermined message is modulated according to pulse position.

Figure 2:
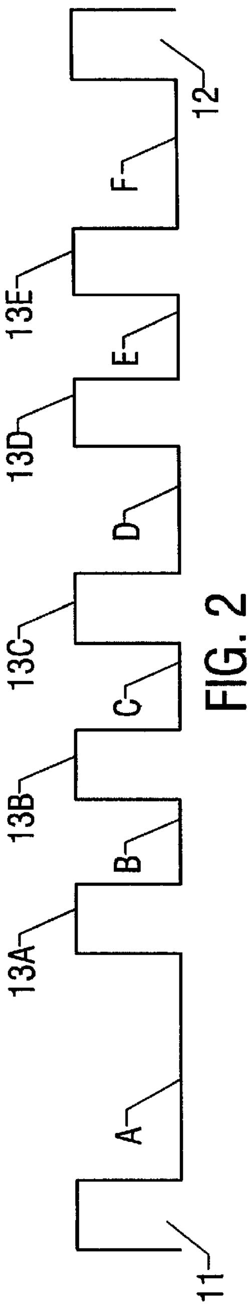
FIG. 2 is a schematic representation of a predetermined message utilised in the communication apparatus of FIG. 1.

Turning now to FIG. 2, the format of the predetermined transmitter message is represented in greater detail. A transmitter message comprises a start pulse (11), an end pulse (12) and five intervening pulses (13*a* through 13*e*). The width of the pulses (11, 12 and 13) may vary between 150 and 250 microseconds with a nominal value of 200 microseconds.

The data content of the message is represented by the time delay between successive pulses. The gap between successive pulses can have 16 discreet values representing four bits of digital information. It will be appreciated that the message represented in FIG. 2, being comprised of seven pulses inclusive of the start and end pulses contains six pulse intervals and thus contains 24 data bits. The intervals are represented by numerals (a to f) in FIG. 2.

The pulse intervals (a to f) contain the following data.

| Interval No | Data |
|---|---|
| a | Site Code (0 to 9) |
| b | Transmitter identification code-Most significant digit (0 to 9) |
| c | Transmitter identification code-Intermediate digit (0 to 9) |
| d | Transmitter identification code-Least significant digit (0 to 9) |
| e | Message type code (0 to 4) |
| f | Checksum |

The message type code contained in interval (e) of the predetermined transmitter message is bit coded to correspond to the activation buttons (5) of FIG. 1, while the checksum contained in interval (e) of the message is obtained by an EXCLUSIVE OR operation of the data in the preceding five nibbles. The checksum is used by the receiver to determine whether any transmission errors have occurred from a receiver. The site code provides a further level of message differentiation, the application of which will be described below.

The communication apparatus finds convenient application in a restaurant or similar hospitality establishment. Each table in the restaurant is equipped with a transmitter (2) and a keypad (4). Each transmitter (2) is linked with a portable receiver (3) which is carried by a waiter assigned to the corresponding table. A portable receiver (3) is linked to the transmitters (2) of all the tables which that particular waiter is allocated to service.

Each activation button (5) on the keypad of a particular table is marked to correspond to a particular request or service required by diners at the table, for example, summoning the waiter, requesting the bill, calling a bar steward, or ordering food. When a diner depresses any one of the activation buttons (5) on the keypad (4), the appropriate predetermined message is transmitted by the transmitter (2) to the corresponding slave receiver (3). The message contains the message code corresponding to the particular service request, the three digit transmitter identification code, as well as the site code. The received message is decoded by the microprocessor in the slave receiver (2) and the requested service is displayed on the display device (6), as well as the transmitter identification code, thereby allowing the restaurant staff to respond promptly and appropriately to the diners' requests.

The site code in the message format enables the communication apparatus (1) to be used in multiple separate adjacent establishments utilising a common carrier frequency with transmissions from one establishment being ignored by the receivers of another establishment within transmission range. For example, two restaurants adjacent each other can program their respective transmitters (2) and slave receivers (3) to employ different site codes. The receivers (3) of either establishment will then be able to filter out received messages having a different site code to their own. It will be appreciated that the range of the communication apparatus (1) is easily extendible by employing repeaters (not shown) as required.

It will further be appreciated that the communication may be utilised in other applications such as in dwellings where certain messages may be sent to a receiver panel to identify the room and the contents of the particular message. Alternatively, the system may be utilised in offices, shopping centres, service stations, roadhouses, hospitals and the like in which a number of predetermined messages may be utilised to improve the efficiency of the activities in these premises.

In particular, the communication apparatus (1) may be applied in casinos and other gaming establishments where transmitters (2) are positioned at convenient positions near gaming tables or slot machines to enable guests to summon services such as bar stewards, cashiers, security personnel and the like.

Yet a further application of the communication apparatus (1) is in supermarkets where transmitters (2) are employed to enable cashiers to summon till managers or other supervisory or packing staff.

Numerous modifications are possible to the above embodiment without departing from the scope of the invention. For example, the design of the transmitters (2) and slave receivers (3) may be altered to reduce power consumption or to increase reception range. Alternatively, the structure of the transmitted message may be altered to employ a different form of modulation such as pulse width or pulse amplitude modulation.

Further, the communication apparatus (1) may include a master receiver (7) with associated display device (8). The master receiver (7) is configured to receive messages from all the transmitters (2) in the establishment. The master receiver (7) is positioned in a central area of the establishment such as the reception desk. The predetermined messages transmitted by all transmitters (2) are received by their associated receivers (3) as well as by the master receiver (7). This facility enables a maitre d'hotel to oversee the restaurant activity from a centralised position and to attend promptly to the diners' requests.

Each slave receiver (3) and the master receiver (7) may, optionally, include a storage buffer for storing transmitted data from more than one message received from its associated transmitters (2). This ensures that diners' requests are properly queued on a first-come first-served basis.

Still further, a transmitter (2) may be configured to be associated with more than one slave receiver (3), while a slave receiver (3) may be associated with more than one transmitter (2). In addition, a particular slave receiver (3) may be configured to only respond to predetermined messages containing certain selected message codes. In the restaurant application, this facility enables a wine steward, say, to carry a slave receiver (3) which is programmed to respond only to messages emanating from a number of different transmitters at tables where diners have activated the selector means (4) to request the wine steward. Diners' requests for other services will be ignored by the wine steward's slave receiver (3).

Lastly, the master receiver (7) may be connected to a computer (not shown) to enable all of the messages received by the master receiver to be downloaded to the computer for later analysis such as work flow optimisation or capacity planning and the like.

The invention therefore provides a novel and inexpensive radio communication apparatus which enables predetermined messages to be dispatched to a receiver within a localised area such as a hospitality or other establishment.

What is claimed is:

1. A communication system, comprising:

a plurality of transmitters, each transmitter being activatable to broadcast any selected one of a plurality of different predetermined coded service request messages along a communication channel;

message selector means associated with each transmitter for selecting any one of the plurality of predetermined coded service request messages, and activating the associated transmitter to broadcast the selected service request message;

a plurality of portable slave receivers, each slave receiver being configurable to receive only from a selected subset of said plurality of transmitters said broadcast predetermined coded service request messages transmitted along the communication channel from said selected subset of transmitters; and portable display means associated with each slave receiver, the display means being arranged to display indicia representative of codes contained in the coded service request messages received by the slave receiver.

2. A communication system as claimed in claim 1 which includes a master receiver configurable to receive the broadcast predetermined coded service request messages along a communication channel from all of the plurality of transmitters along the communication channel, the master receiver having an associated display means for displaying indicia representative of the codes contained in the coded service request messages received by the master receiver.

3. A communication system as claimed in claim 2 in which the master receiver includes a storage buffer for storing codes contained in a plurality of service request messages received from all of the transmitters of the communication system.

4. A communication system as claimed in claim 1 in which each different predetermined service request message includes an identification code representative of the transmitter from which the predetermined message was broadcast.

5. A communication system as claimed in claim 4 in which each different predetermined coded service request message also includes a type code representative of the type of predetermined service request message broadcast by the transmitter.

6. A communication system as claimed in claim 5 in which each different predetermined coded service request message also includes a site code representative of the identity of a group to which the broadcast service request message belongs.

7. A communication system as claimed in claim 5 in which the display means associated with each slave receiver is configurable to only display indicia corresponding to received service request messages which contain selected message type codes.

8. A communication system as claimed claim 1 in which the predetermined coded service request messages are pulse messages.

9. A communication system as claimed in claim 8 in which the pulse messages are modulated according to pulse position.

10. A communication system as claimed claim 8 in which the pulse messages contain 24 data bits.

11. A communication system as claimed claim 1 in which the communication channel is a radio frequency channel.

12. A communication system as claimed in claim 11 in which the radio frequency channel is an ultra high frequency (UHF) channel.

13. A communication system as claimed in claim 1 in which each transmitter and receiver includes a surface acoustic wave resonator.

14. A communication system as claimed in claim 1 in which the transmitters are battery powered.

15. A communication system as claimed in claim 1 in which the message selector means is a keypad or a membrane keyboard.

16. A communication system as claimed in claim 1 in which the display means is a digital display means.

17. A communication system as claimed in claim 1 in which each slave receiver includes a storage buffer for storing codes contained in a plurality of service request messages from the transmitters to which the slave receiver is responsive.

18. A method of communication, comprising the steps of:

selecting, by means of a message selector means, a selected one of a plurality of different predetermined coded service request messages to be transmitted from a transmitter;

establishing an association between said transmitter and at least one receiver such that messages transmitted from said transmitter are received only by said at least one receiver;

activating said transmitter to broadcast the selected service request message along a communication channel;

receiving the broadcast coded service request message at each receiver associated with said transmitter; and displaying, on a portable display means associated with said receiver, indicia representative of codes contained in the coded service request message received by the slave receiver.

19. A method as claimed in claim 18 in which an identification code is included in the broadcast coded service request message representative of the transmitter from which the selected service request message is broadcast.

20. A method as claimed in claim 19 in which a type code representative of the type of coded service request broadcast by the transmitter is included in the broadcast coded service request message.

21. A method as claimed in claim 20 in which a site code representative of the identity of a group to which the broadcast service message belongs is included in the broadcast coded service request message.

22. A method as claimed in claim 18 which includes the further steps of:

receiving the broadcast coded service request message at a master receiver; and displaying, on a display means associated with the master receiver indicia representative of codes contained in the coded service request message received by the master receiver.

23. A method as claimed in claim 18 which includes the further step of buffering in the slave receiver codes contained in a plurality of broadcast coded service request messages received by the slave receiver from the transmitters to which the slave receiver is responsive.

24. A method as claimed in claim 22 which includes the further step of buffering in the master receiver codes contained in a plurality of broadcast coded service request messages received by the master receiver from all of the plurality of transmitters.

* * * * *